United States Patent
Yamaguchi

(10) Patent No.: US 12,128,819 B2
(45) Date of Patent: Oct. 29, 2024

(54) LIGHT-EMITTING FABRIC, METHOD OF PRODUCING LIGHT-EMITTING FABRIC, AND INTERIOR MATERIAL FOR VEHICLES

(71) Applicant: TOYOTA BOSHOKU KABUSHIKI KAISHA, Aichi-ken (JP)

(72) Inventor: Tsuyoshi Yamaguchi, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 18/377,624

(22) Filed: Oct. 6, 2023

(65) Prior Publication Data

US 2024/0116436 A1   Apr. 11, 2024

(30) Foreign Application Priority Data

Oct. 11, 2022 (JP) .................. 2022-163022

(51) Int. Cl.
*B60Q 3/233* (2017.01)
*D03D 15/547* (2021.01)
*F21V 8/00* (2006.01)

(52) U.S. Cl.
CPC ........... *B60Q 3/233* (2017.02); *D03D 15/547* (2021.01); *G02B 6/001* (2013.01)

(58) Field of Classification Search
CPC .......... B60Q 3/233; B60Q 3/54; B60Q 3/745; D03D 15/547; G02B 6/001
See application file for complete search history.

(56) References Cited

U.S. PATENT DOCUMENTS

| 2003/0006693 A1* | 1/2003 | Topelberg | H05B 33/12 313/483 |
| 2004/0037091 A1* | 2/2004 | Guy | D03D 15/547 362/582 |
| 2004/0047142 A1* | 3/2004 | Goslee | G02B 6/001 362/576 |
| 2005/0252568 A1* | 11/2005 | Huang | D03D 15/547 139/420 A |
| 2008/0002393 A1* | 1/2008 | Moon | G02B 6/0006 362/97.1 |
| 2009/0291606 A1* | 11/2009 | Malhomme | D03D 15/00 442/232 |
| 2010/0105270 A1* | 4/2010 | Peng | D03D 15/54 442/301 |

(Continued)

FOREIGN PATENT DOCUMENTS

| JP | 2010-267573 | 11/2010 |
| WO | 2018-008781 | 1/2018 |
| WO | 2020-234523 | 11/2020 |

*Primary Examiner* — Zheng Song

(74) *Attorney, Agent, or Firm* — GREENBLUM & BERNSTEIN, P.L.C.

(57) ABSTRACT

A light-emitting fabric includes light-guiding threads woven thereinto. The light-guiding threads are side-emitting light-guiding threads having a core-cladding structure. At least a part of the claddings of the light-guiding threads exposed on the side of a design surface of the light-emitting fabric is processed with blast-grinding. The interior material for vehicles includes the light-emitting fabric. A method of producing a light-emitting fabric includes blast-grinding at least a part of the claddings of light-guiding threads exposed on the side of a design surface of a fabric to be made into the light-emitting fabric.

4 Claims, 2 Drawing Sheets

(56) References Cited

U.S. PATENT DOCUMENTS

| | | | | |
|---|---|---|---|---|
| 2011/0269358 | A1* | 11/2011 | Peng | D03D 15/547 |
| | | | | 442/59 |
| 2017/0342607 | A1* | 11/2017 | Yamada | D03D 15/283 |
| 2018/0340684 | A1* | 11/2018 | Yamada | D03D 15/547 |
| 2022/0220027 | A1* | 7/2022 | Puzenat | B01J 23/50 |

* cited by examiner

LIGHT-EMITTING FABRIC, METHOD OF PRODUCING LIGHT-EMITTING FABRIC, AND INTERIOR MATERIAL FOR VEHICLES

CROSS REFERENCE TO RELATED APPLICATIONS

The present application claims priority under 35 USC § 119 to Japanese Patent Application No. 2022-163022 filed on Oct. 11, 2022, the disclosure of which is hereby expressly incorporated by reference in its entirety.

BACKGROUND OF THE INVENTION

(1) Field of the Invention

The present invention relates to a light-emitting fabric, a method of producing the light-emitting fabric, and an interior material for vehicles.

More specifically, the present invention relates to a light-emitting fabric containing light-guiding threads as constituent threads, a method of producing the light-emitting fabric, and an interior material for vehicles.

(2) Description of Related Art

There are known light-emitting fabrics using light-guiding threads (optical fibers) as constituent threads. Light-emitting fabrics have a configuration in which, when light is incident from one end, the incident light travels to the other end and, during this traveling, the light leaks from the side surfaces of light-guiding threads which are constituent threads, so that the surface of the light-emitting fabric appears to emit light. A technique related to such a light-emitting fabric is disclosed in JP 2010-267573 A. Further, WO 2018/008781 discloses a method that uses a laser beam as a processing method to achieve such light emission from the side surfaces of light-guiding threads.

SUMMARY OF THE INVENTION

The light-guiding threads used in light-emitting fabrics are originally intended to guide light incident from one end to reach the other end. As such, the light-guiding threads are not provided to meet a specification in which, for example, all the incident light leaks over a short distance and fails to reach the other end. For this reason, users actually use standardized light-guiding threads to form light-emitting fabrics or purchase light-emitting fabrics that use standardized light-guiding threads, and utilize the side-emitting performance (light leakage performance) thereof as it is.

However, from the perspective of light-emitting design, it is considered that the degree of freedom of light-emitting design can be dramatically improved if it is possible to control the amount of light that is emitted (leaked) at a predetermined distance from the incident position of light directed to the light-guiding threads. In this regard, for example, the degree of freedom of light-emitting design can be increased by adjusting the amount of incident light. However, the increase in an amount of light necessitates an adaptation to an increase in energy use, thereby increasing a size of an accompanying part. Further, the amount of leftover light from the emergent end portion of the light-guiding threads is also increased, making it necessary to devise a way to process the leftover light. As described above, the challenge presented here is that, with the current light-emitting fabrics, the side-emitting performance (light leakage performance) cannot be enhanced according to the place of use and the purpose.

JP 2010-267573 A discloses an optical fiber illumination device aiming to reduce light emission unevenness of an optical fiber fabric, but there is no description or suggestion of necessity, means, or configuration regarding control of side-emitting performance (light leakage performance).

WO 2018/008781 discloses a method for producing a high-luminance light-emitting fabric using a laser etching method that allows for uniform and precise etching of the claddings of optical fibers, that allows for precise adjustment of the depth of etching, and that does not damage other constituent threads. Although this technique has a potential to be used to enhance the side-emitting performance, a laser etching method is a process in which a laser beam is focused, and thus the processing area is limited to a spot-like area that is very narrow. Therefore, an enormous amount of processing time is required to control the side-emitting performance (light leakage performance) of light-emitting fabrics using a laser etching method, which is unrealistic from the viewpoint of processing time and cost. In addition, when a laser etching method is used, as described above, the process is performed in a spot-like area, and dot-shaped or line-shaped bits are removed from the cladding, resulting in clear boundaries between the processed portions and the unprocessed portions. As such, the resulting design shows individual light-guiding threads each emitting dot-shaped or line-shaped light, and problematically, fails to form a light-emitting design having a continuous spread of light.

The present invention has been made in view of the above circumstances, and an object of the present invention is to provide a light-emitting fabric having an increased luminance of a desired region, a method of producing a light-emitting fabric capable of increasing the luminance of a desired region, and an interior material for vehicles using such a light-emitting fabric.

That is, the present invention includes the following.

[1] A light-emitting fabric having light-guiding threads woven thereinto, in which
the light-guiding threads are side-emitting light-guiding threads having a core-cladding structure, and
at least a part of the claddings of the light-guiding threads exposed on a side of a design surface of the light-emitting fabric is processed with blast-grinding.

[2] The light-emitting fabric according to [1], wherein
the light-guiding threads are woven together with non-light-guiding threads; and
exposed portions exposed between the non-light-guiding threads are processed with the blast-grinding.

[3] The light-emitting fabric according to [1] or [2], wherein
$\theta_1 \leq \theta_0$, where, assuming that a center of a substantially circular cross-section of the light-guiding thread perpendicular to a light-guiding direction thereof is P, $\theta_1$ is an angle, with respect to P, of a region processed with the blast-grinding, and $\theta_0$ is an angle, with respect to P, of a region that is not processed with the blast-grinding.

[4] The light-emitting fabric according to [2], wherein the non-light-guiding threads are multifilaments.

[5] An interior material for vehicles, the interior material including the light-emitting fabric described in any one of [1] to [4].

[6] A method of producing a light-emitting fabric having light-guiding threads woven thereinto, wherein
the light-guiding threads are side-emitting light-guiding threads having a core-cladding structure, and the method includes blast-grinding at least a part of the claddings of the light-guiding threads exposed on a side of a design surface of a fabric that is to be made into the light-emitting fabric.

[7] The method of producing a light-emitting fabric according to [6], wherein a blasting material used in the blast-grinding includes a water-soluble inorganic compound.

[8] The method of producing a light-emitting fabric according to [7], wherein the blasting material has an average particle size of from 0.01 to 0.6 mm.

[9] The method of producing a light-emitting fabric according to any one of [6] to [8], wherein the method includes, after the blast-grinding, washing, with water, the fabric that is to be made into the light-emitting fabric.

According to the light-emitting fabric of the present invention, it is possible to provide a light-emitting fabric having an increased luminance of a desired region. More specifically, in the light-emitting fabric, the claddings of the light-guiding threads exposed on the side of a design surface are removed or thinned by blast-grinding. Hence, in the region processed with blast-grinding, wide and efficient light emission is achieved in the entire region of those light-guiding threads that are exposed on the side of a design surface. Therefore, it is possible to achieve a light-emitting fabric in which light emission in the described region is uniformly enhanced when compared to light emission before blast-grinding. This also makes it possible to provide a light-emitting design that has excellent spread of light and continuity.

The interior material for vehicles of the present invention includes the light-emitting fabric, and thus it is possible to provide a light-emitting design that has excellent spread of light and continuity.

According to the method of producing a light-emitting fabric, the luminance of a desired region of the light-emitting fabric can be increased. More specifically, the claddings of the light-guiding threads exposed on the side of a design surface can be removed or thinned by blast-grinding. Hence, in the region processed with blast-grinding, wide and efficient light emission is achieved in the entire region of those light-guiding threads that are exposed on the side of a design surface. Therefore, it is possible to provide a light-emitting fabric that achieves uniformly enhanced light emission in the described region when compared to a fabric prior to blast-grinding. This also makes it possible to provide a light-emitting design that has excellent spread of light and continuity.

BRIEF DESCRIPTION OF THE DRAWINGS

The present invention will be further described in the following detailed description with reference to the following figures, given non-limiting examples of exemplary embodiments according to the invention, and like reference symbols represent identical parts through several figures.

DETAILED DESCRIPTION OF PREFERRED EMBODIMENTS

Subjects shown herein are illustrative one and one for describing embodiments of the invention exemplarily, and are described for providing one believed to be explanation in which the principles and conceptual characteristics of the invention can be understood most effectively and without any difficulty. In this regard, no attempt is made to show structural details of the invention in more detail than is necessary for the fundamental understanding of the invention, and the description is taken with the drawings making apparent to those skilled in the art how several forms of the invention may be embodied in practice.

[1] Light-Emitting Fabric

Figure 1:
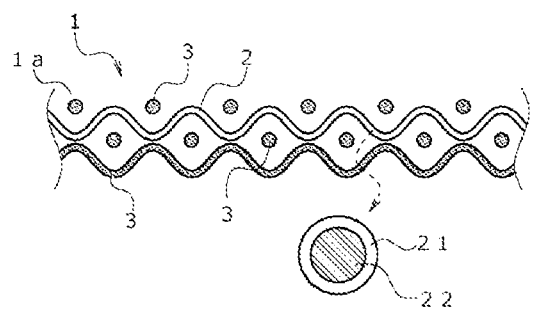
FIG. 1 is an explanatory diagram illustrating an example of a light-emitting fabric.

A light-emitting fabric 1 according to the present invention includes light-guiding threads 2 woven thereinto, the light-guiding threads 2 are side-emitting light-guiding threads having a core-cladding structure, and at least a part of the claddings 21 of light-guiding threads exposed on the side of a design surface 1a of the light-emitting fabric 1 is processed with blast-grinding (see FIG. 1).

The light-emitting fabric 1 may be formed only of light-guiding threads 2, but usually includes non-light-guiding threads 3. That is, when the light-emitting fabric 1 includes the non-light-guiding threads 3, the light-emitting fabric 1 is woven from the light-guiding threads 2 and the non-light-guiding threads 3. The light-guiding threads 2 may be included as warp threads, may be included as weft threads, or may be included as both warp threads and weft threads. Particularly, the light-guiding threads 2 are preferably included as warp threads or weft threads, and more preferably included as weft threads. Meanwhile, the non-light-guiding threads 3 may be included as warp threads, may be included as weft threads, or may be included as both warp threads and weft threads. Particularly, the non-light-guiding threads 3 are preferably included as both warp threads and weft threads.

The light-guiding threads 2 are threads capable of guiding light incident from one end to travel to the other end and allowing the light to leak from the side surface. Specifically, the light-guiding threads 2 have a core-sheath structure including a core and a sheath (cladding), that is, a "core-cladding structure". The light-guiding threads 2 are capable of guiding light based on a difference in refractive index between the core and the sheath. Each of the light-guiding threads 2 may have any core-cladding structure, such as a core-cladding structure having one core in one cladding, or a core-cladding structure having two or more cores in one cladding (see FIG. 1).

Furthermore, the light-guiding threads 2 may be multi-filaments, but are usually monofilaments. When the light-guiding threads 2 are multifilaments, all of the constituent threads constituting the filaments may be threads having light-guiding performance, or only a part of the constituent threads may have light-guiding performance.

In addition, the light-guiding threads 2 are preferably made of a resin from the viewpoint of weaving performance. Specifically, the light-guiding threads 2 that can be used include (1) light-guiding threads 2 in which the refractive indexes of the core resin and the cladding resin used in combination are not in a relationship that leads to total internal reflection at the core-sheath interface (core-cladding interface), and (2) light-guiding threads 2 in which the core resin is blended with a light-scattering substance.

That is, the case (1) is a type of "side-surface light-emission" light-guiding threads (i.e. "side-emitting" light-guiding threads) 2 utilizing a phenomenon in which light guided inside the core is not totally reflected at the core-sheath interface but leaks from the sheath to the outside. Meanwhile, the case (2) is a type of "side-surface light-emission" light-guiding threads (i.e. "side-emitting" light-guiding threads) 2 utilizing a phenomenon in which, since a light-scattering substance is blended, the scattered light scattered by the light-scattering substance during the light-guiding process leaks from the side surface. In the light-guiding threads 2 according to the case (2), the luminance can be controlled by adjusting the concentration of the light-scattering substance to be blended. Furthermore, the light-guiding threads 2 may be side-emitting light-guiding threads 2 having a configuration other than these configurations. One type of these light-guiding threads 2 may be used, or two or more types of these light-guiding threads 2 may be used in combination.

A diameter of each of the light-guiding threads 2 is not limited, but can be, for example, from 0.01 mm to 2.0 mm, preferably from 0.05 mm to 1.5 mm, and more preferably from 0.1 mm to 1.0 mm, from the viewpoint of achieving a suitable weaving performance.

The proportion of the light-guiding threads 2 in the warp threads or weft threads is not limited, but is usually 10% or greater, preferably from 10% to 90%, more preferably from 20% to 80%, and even more preferably from 30% to 70% with respect to the total number of the warp threads or with respect to the total number of the weft threads, assuming the total number of the warp threads or the weft threads is 100%. In particular, when the light-guiding threads 2 are included only as weft threads, the light-guiding threads serving as the warp threads are preferably 0% with respect to 100% of the total number of warp threads, and are preferably 10% or greater, preferably from 10% to 90%, more preferably from 20% to 80%, and even more preferably from 30% to 70% with respect to 100% of the total number of weft threads.

In the light-emitting fabric 1 according to the present invention, at least a part of the claddings 21 of the light-guiding threads 2 exposed on the side of the design surface 1a of the light-emitting fabric 1 is processed with blast-grinding. The term "processed with blast-grinding" means the claddings 21 are ground by being subjected to blasting of a blasting material. Details of the blast-grinding will be separately described later.

Figure 2:
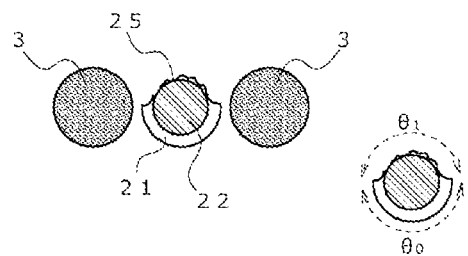
FIG. 2 is an explanatory diagram illustrating a light-guiding thread processed with blast-grinding.

In the light-guiding threads 2 processed with blast-grinding (see FIG. 2), the cladding 21 is removed and the core 22 is exposed, or the thickness of the cladding 21 is smaller than that of the cladding 21 in a part that is not processed with blast-grinding (the cladding 21 is thinned). These aspects may be present together at the same time. With such a configuration, an amount of light leakage from a part 25 processed with blast-grinding is increased as compared with a part that is not processed with blast-grinding. Usually, in the cross-sectional shape of the light-guiding thread 2, the outline of the part 25 processed with blast-grinding is positioned closer to the center than the outline of a part that is not processed with blast-grinding. Therefore, the cross-sectional shape is no longer circular.

In addition, when the cladding 21 is removed or thinned through blast-grinding, the light-guiding threads 2 exposed from a design surface existing in a desired region can be subjected to grinding all together, and a wide area of the exposed surface of the light-guiding threads 2 can be subjected to grinding. That is, the light-guiding threads 2 exposed on the side of the design surface 1a are usually the light-guiding threads 2 exposed between the non-light-guiding threads 3 on the design surface 1a. As such, portions of the light-guiding threads 2 exposed between the non-light-guiding threads 3 (that is, exposed portions) are present on the design surface 1a of the light-emitting fabric 1 in large numbers. This allows for a configuration in which a plurality of the exposed portions adjacent to each other are subjected to grinding all together. Therefore, such a configuration can reduce a drop in light emission between the adjacent exposed portions, and can realize continuity in a light-emitting design and facilitates creating a light-emitting design having a spread of light.

Figure 3:
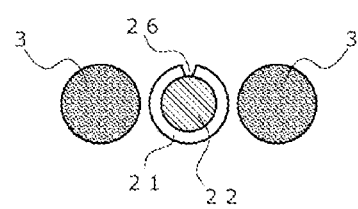
FIG. 3 is an explanatory diagram illustrating a light-guiding thread processed with laser etching.

That is, when a laser etching method is used to remove or thin the cladding (see FIG. 3), the processing needs to be performed in a way that does not damage the adjacent non-light-guiding threads 3, making it difficult to remove or thin the claddings 21 on the entire exposed surface of the light-guiding threads 2. Therefore, when the laser etching method is used to remove or thin the claddings, a processed portion 26 emits light narrowly resulting in a bright spot or a bright line. Thus, it is difficult to realize continuity in a light-emitting design between the processed portion 26 and the adjacent light-guiding threads 2, and thus difficult to create a light-emitting design having a spread of light. In contrast, in the light-emitting fabric 1 according to the present invention, as described above, the exposed portions of the light-guiding threads 2 can be subjected to grinding all together. In addition, a wide area of the exposed surface of the light-guiding threads 2, up to the boundary regions with the adjacent non-light-guiding threads 3, can be subjected to grinding. Therefore, the light-emitting fabric 1 can suppress a drop in light emission between the adjacent light-guiding threads 2, and can realize continuity in a light-emitting design and facilitates creating a light-emitting design having a spread of light.

More specifically, in the light-guiding threads 2 processed with blast-grinding, $\theta_1$ can be greater than or equal to $\theta_0$, where, assuming the center of a substantially circular cross-section of the light-guiding thread 2 perpendicular to a light-guiding direction thereof is P, $\theta_1$ is an angle, with respect to P, of a region processed with blast-grinding, and $\theta_0$ is an angle, with respect to P, of a region that is not processed with blast-grinding. This configuration can be significant, particularly in the light-guiding threads 2 serving as the upper threads on the side of the design surface 1a of the light-emitting fabric 1.

The non-light-guiding threads 3 are threads that do not have light-guiding properties. The non-light-guiding threads 3 may be monofilaments, but are preferably multifilaments. When the non-light-guiding threads 3 are multifilaments, it is possible to prevent or suppress the grinding of the non-light-guiding threads 3 due to blast-grinding. That is, when the non-light-guiding threads 3 are multifilaments, the collision impact of the blasting material can be absorbed or mitigated. Thus, the strength of the light-emitting fabric 1 can be maintained. That is, when the non-light-guiding threads 3 are monofilaments, the non-light-guiding threads 3 may be ground due to blast-grinding in the same manner as the light-guiding threads 2, leading to a possible decrease in the strength of the light-emitting fabric 1 caused by grinding. In this regard, when grinding of the non-light-guiding threads 3a is prevented or suppressed, decrease in the strength of the light-emitting fabric 1 can be prevented.

The material constituting the non-light-guiding threads 3 is not limited, and may be a natural fiber or a synthetic fiber.

When the material constituting the non-light-guiding threads 3 is a synthetic fiber, examples of the constituent resin thereof include polyamide resins such as nylon 6 and nylon 66, polyester resins such as polyethylene terephthalate, polybutylene terephthalate, and polytrimethylene terephthalate, polyolefin resins such as polypropylene, and polyacrylic resins. One of these examples may be used, or two or more of these examples may be used in combination.

The linear density of the non-light-guiding threads 3 is not limited, but may be, for example, from 10 dtex to 2000 dtex, preferably from 20 dtex to 1000 dtex, and more preferably from 30 dtex to 700 dtex.

When the non-light-guiding threads 3 are multifilaments, the number of constituent threads is not limited, but can be, for example, 10 or more, preferably 100 or more, and more preferably 200 or more. The upper limit of the number of constituent threads is not limited, and can be, for example, 10000 or less, 5000 or less, or 2500 or less.

Further, the non-light-guiding threads 3 can be free of light transmission inhibiting component, or can contain a light transmission inhibiting component. When the non-light-guiding threads 3 contain a light transmission inhibiting component, the light shielding property with respect to the light-guiding threads 2 can be improved.

The light transmission inhibiting component may be any component capable of inhibiting light transmission. For example, the light transmission inhibiting component may inhibit light transmission by reflection or dispersion, may inhibit light transmission by light absorption, or may inhibit light transmission by another action. Specific examples of the light transmission inhibiting component include colorants (such as pigments and dyes), light absorbers, and extenders (such as various fillers).

The weaving pattern of the light-emitting fabric 1 according to the present invention is not limited, and commonly known weaving patterns can be used as appropriate. Specific examples of the weaving pattern include plain weave, twill weave, and satin weave. One of these examples may be used, or two or more of these examples may be used in combination. Furthermore, the fabric structure of the light-emitting fabric 1 according to the present invention is not limited, and commonly known fabric structures can be used as appropriate. Specifically, the light-emitting fabric 1 may be a single-layer fabric, a multilayer fabric, or a composite thereof.

In the light-emitting fabric 1 according to the present invention, the entire design surface may be processed with blast-grinding, or only a part of the design surface may be processed with blast-grinding. Examples of the case in which only a part of the design surface is processed with blast-grinding include the light-emitting fabric 1 having a pattern formed thereon through blast-grinding. In this case, the light emission can be increased in the pattern when compared to the other portions. That is, the luminance of the region of the light-emitting fabric 1 processed with blast-grinding can be increased when compared to the luminance of the region that is not processed with blast-grinding. This makes it possible to create a design utilizing a difference in luminance between the region processed with blast-grinding and the region that is not processed with blast-grinding. Examples of the pattern include a picture, a character, and a pattern (such as a repetitive pattern and a line pattern). One of these examples may be used, or two or more of these examples may be used in combination.

Further, in the light-emitting fabric 1 according to the present invention, the luminance in a desired region is enhanced, making it possible to use less power of the light source. Therefore, the amount of energy used for light emission of the light-emitting fabric 1 can be reduced. In addition, since the power of the light source can be reduced, the amount of heat generated by the light source can be improved, and the size of the accompanying components can be kept small.

The light-emitting fabric 1 according to the present invention can include a convergent end to facilitate connection with the light source. The convergent end is formed by the end surfaces of bundled light-guiding threads 2 are aligned. The light-emitting fabric 1 may include only one convergent end, or may include a plurality of convergent ends in which an appropriate number of light-guiding threads 2 are bundled in accordance with the light-emitting design.

[2] Interior Material for Vehicles

An interior material for vehicles according to the present invention includes the light-emitting fabric 1 according to the present invention.

In the interior material for vehicles, the light-emitting fabric 1 can be utilized as interior surfaces. That is, a design of vehicle interior material can be created.

Further, the interior material for vehicles can include another constituent part in addition to the light-emitting fabric 1. Examples of the other constituent parts include a base material and a light source (such as an LED light source). One of these examples may be used, or two or more of these examples may be used in combination.

The base material is a component on whose surface the light-emitting fabric 1 is fixed. The base material can be formed of any material, such as a resin material. Examples of the resin material include polyolefin, polyester, and polyamide. One of these examples may be used, or two or more of these examples may be used in combination. In addition, the base material can be a fibrous molded object formed by binding reinforcement fibers using a binder resin. In this case, polyolefin can be used as the binder resin. Examples of the reinforcement fibers include plant fibers, resin fibers (such as polyester fibers and polyamide fibers), and inorganic fibers (such as glass fibers and carbon fibers). One of these examples may be used, or two or more of these examples may be used in combination. Among the foregoing, the plant fibers can be kenaf, hemp, jute, and the like. One of these may be used, or two or more of these may be used in combination. In the fibrous molded object, the ratio of the amount of the binder resin to the amount of the reinforcement fibers is not limited. When the total amount of the binder resin and the reinforcement fibers is set to 100 mass %, the ratio of the reinforcement fibers can be set to from 10 to 90 mass %, from 25 to 75 mass %, from 35 to 65 mass %, or the like.

When applied to vehicles such as automobiles, the interior material for vehicles may be used in, for example: a trim part, such as a door trim, an armrest, an upper trim, a decorative panel, an ornament panel, a lower trim, a pocket (a door trim pocket), a quarter trim, and a deck side trim; a pillar garnish; a cowl side garnish (a cowl side trim); a seat part, such as a side airbag peripheral part; an instrument panel part, such as a center cluster, an air vent, a center console storage compartment (or a lid thereof), a glove box door, and an airbag peripheral part; a center console; an overhead console; a sun visor; a trunk floor panel (a cargo floor panel) and an underseat tray; a package tray; a CRS cover; a seat side garnish; and an assist grip. The interior material for vehicles may be used in one of these examples, or may be used in two or more of these examples.

Furthermore, examples of the vehicle include railway vehicles, aircrafts, and ships, in addition to vehicles such as automobiles.

[3] Method of Producing Light-Emitting Fabric

Figure 4:
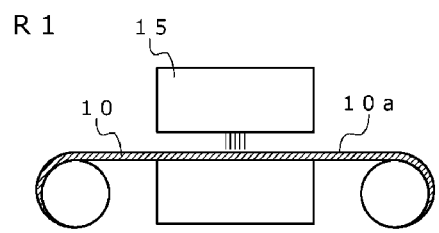
FIG. 4 is an explanatory diagram illustrating the blast-grinding.

The method of producing a light-emitting fabric according to the present invention is a method of producing the light-emitting fabric 1 having the light-guiding threads 2 woven thereinto, wherein the light-guiding threads 2 are side-emitting light-guiding threads having a core-cladding structure, and the method includes blast-grinding R1 at least a part of the claddings 21 of the light-guiding threads 2 exposed on the side of the design surface 10a of a fabric 10 that is to be made into the light-emitting fabric 1 (see FIG. 4).

In the present method, the light-guiding threads, the core-cladding structure, and the side-emitting light-guiding threads are as described above. In addition, the fabric 10 is to be made into the light-emitting fabric 1 which is a finished product. The fabric 10 differs from the light-emitting fabric 1 in that the fabric 10 has not been processed with the blast-grinding R1, but the configuration of the fabric 10 is as described above.

The "blast-grinding R1" described above is a step of blast-grinding at least a part of the claddings 21 of the light-guiding threads 2 exposed on the side of the design surface 10a of the fabric 10. That is, the blast-grinding R1 is a step of grinding the claddings 21 by blasting a blasting material. This step can be performed using a blasting device 15. The claddings 21 of the light-guiding threads 2 exposed on the side of the design surface 10a of the fabric 10 can be removed or thinned by the grinding.

That is, in this method, the claddings 21 of the light-guiding threads 2 exposed on the side of the design surface 1a of the light-emitting fabric 1 can be removed or thinned by blast-grinding. The term "blast-grinding" means grinding the claddings 21 by blasting a blasting material. Through blast-grinding, the claddings 21 of the light-guiding threads 2 provided before processing can be removed, or the thicknesses of the claddings 21 can be reduced (the claddings 21 can be thinned). These aspects may be present together at the same time. Consequently, it is possible to increase the amount of light leakage from the parts processed with blast-grinding.

In addition, through removal or thinning of the claddings 21 by blast-grinding, the light-guiding threads 2 exposed from the design surface existing in a desired region can be subjected to grinding all together, and a wide area of the exposed surface of the light-guiding threads 2 can be subjected to grinding. Therefore, the method can reduce a drop in light emission between the adjacent exposed portions, and can realize continuity in a light-emitting design and facilitates creating a light-emitting design having a spread of light. In addition to allowing for grinding of a wide area, removing or thinning the claddings 21 through blast-grinding also allows for continuous grinding. Therefore, the raw fabric which is to be made into the light-emitting fabric can be fed into the blasting device and subjected to a continuous blasting process, resulting in excellent mass productivity.

In the blast-grinding R1, the blasting material used is not limited. That is, the material of the blasting material, the hardness of the blasting material, the shape of the blasting material, and the like are not limited. The blasting method is also not limited. That is, the blasting method may be mechanical blasting, pneumatic blasting, or wet blasting. In addition, blasting conditions such as the blasting speed, blasting angle, blasting amount, and blasting pressure are also not limited.

Among the foregoing, the material of the blasting material is preferably water-soluble (including warm/hot-water-soluble). When the material of the blasting material is water-soluble, after blasting is performed in the blast-grinding R1, the blasting material or its residue adhering to the processed fabric 10 or sticking between the constituent threads can be removed by water washing (warm/hot water washing). Although the degree of water solubility is not limited, the solubility in water is preferably 5 g/100 g (20° C.) or greater.

The material that is water-soluble may be a water-soluble organic substance such as a water-soluble resin or sucrose, but is preferably a water-soluble inorganic compound from the viewpoint of achieving higher detergency.

Examples of the water-soluble inorganic compound include sodium hydrogencarbonate [9.6 g/100 g (20° C.)], sodium carbonate [21.6 g/100 g (20° C.)], potassium nitrate [31.6 g/100 g (20° C.)], potassium hydrogencarbonate [33.3 g/100 g (20° C.)], potassium chloride [34.2 g/100 g (20° C.)], magnesium chloride [35.3 g/100 g (20° C.)], sodium chloride [35.8 g/100 g (20° C.)], calcium chloride [42.7 g/100 g (20° C.)], potassium bromide [60.0 g/100 g (20° C.)], and sodium nitrate [88.0 g/100 g (20° C.)]. One of these examples may be used, or two or more of these examples may be used in combination.

Among the foregoing, the hardness of the blasting material is preferably 1 or greater, more preferably 1.5 or greater, and even more preferably 2 or greater on the new Mohs' hardness scale. The upper limit of the hardness on the new Mohs' hardness scale is not limited, but is preferably 6 or less, and more preferably 4 or less.

The shape of the blasting material is preferably granular, and can be spherical, polygonal, or the like.

Furthermore, the average particle size of the blasting material is preferably 0.01 mm or greater, more preferably 0.03 mm or greater, even more preferably 0.05 mm or greater, and particularly preferably 0.07 mm or greater. The upper limit of the average particle size is not limited, but is preferably 0.6 or less, more preferably 0.5 or less, even more preferably 0.4 or less, and particularly preferably 0.3 or less. Note that, the average particle size of the blasting material is a d50 value measured using a laser diffraction/scattering particle size analyzer.

Further, the blasting method is preferably mechanical blasting and/or pneumatic blasting from the viewpoint of blasting a blasting material that is water-soluble as described above.

Figure 5:
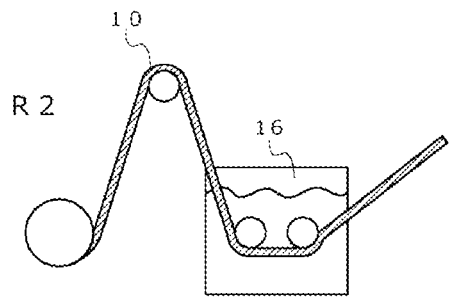
FIG. 5 is an explanatory diagram illustrating the water-washing.
Figure 6:
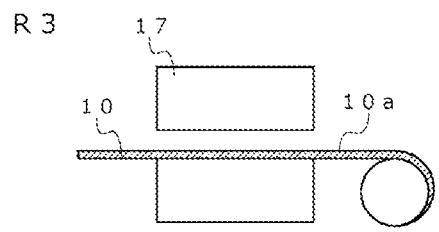
FIG. 6 is an explanatory diagram illustrating the drying.

The present method may or may not include other steps in addition to the blast-grinding R1, but can include, after the blast-grinding R1, water-washing R2 (see FIG. 5) of washing with water the fabric 10 that is to be made into the light-emitting fabric 1. This step can be performed using a water washing tank 16. Further, the present method can include drying R3 (see FIG. 6) of drying the water-washed fabric 10 after the water washing R2. This step can be performed using a drying device 17.

When a blasting material that is water-soluble (water-soluble blasting material) is used as the blasting material as described above, the blasting material and/or the crushed product thereof tend to remain in the fabric 10. However, by providing the water-washing R2, the residue of the blasting material can be dissolved in water and easily removed.

The water-washing R2 may be performed in any manner. For example, water-washing may be performed by spraying water onto the fabric 10, or may be performed by submerging the fabric 10 in a water tank containing water, or by another method. These methods may be used alone or in a combination of two or more.

In addition, it goes without saying that the water used may have a temperature of 25° C. or lower (cold/room temperature water) or may have a temperature of higher than 25° C. (warm/hot water). In general, the temperature of water used in the water-washing is preferably high because a higher temperature results in a higher solubility of the substance to be removed.

Note that, in the light-emitting fabric 1 according to the present invention, at least a part of the claddings 21 of the light-guiding threads 2 exposed on the side of the design surface 1a of the light-emitting fabric 1 is processed with blast-grinding. However, it is impossible or impractical to directly specify the structure or properties of the light-emitting fabric processed with blast-grinding. That is, the blast-grinding is performed by blowing a large number of particles of the blasting material to the fabric that is to be made into the light-emitting fabric. The particles of the blasting material do not all have a uniform shape, and they randomly collide with the light-guiding threads, and remove or thin the claddings of the light-guiding threads in the meantime. Consequently, the removed or thinned portions do not have a specific shape and cannot be specified by words.

In addition, although the region processed with blast-grinding has an increased luminance, the appearance is completely different when compared to, for example, the case where the luminance is increased by laser etching as described above. The reason is considered to be because when blast-grinding is performed, a wide area of the exposed surface of the light-guiding threads, up to the boundary regions with the adjacent non-light-guiding threads, is subjected to grinding, and thus a drop in light emission between the adjacent light-guiding threads is suppressed. However, from a micro perspective, the reason differs depending on the portion that is subjected to grinding.

Therefore, to elucidate the mechanism of the action, one possible way is to observe the individual portions removed or thinned by blast-grinding one by one and calculate the average value of the shapes, but the measurement requires an enormous amount of time and cost. As such, the elucidation of the mechanism is impractical, considering the enormous amount of time and cost required as well as the need for promptness and the like required by the nature of patent applications.

EXAMPLES

Hereinafter, the present invention will be described in detail with reference to Examples.

[1] Preparation of Precursor Fabric

Fabrics (precursor fabrics) were prepared using the light-guiding threads below as a part of the weft threads and the non-light-guiding threads below as the remaining part of the weft threads and the warp threads.

Light-guiding threads: side-emitting light-guiding threads (each having a polymethyl methacrylate core, a fluorinated resin cladding, and a diameter of 250 μm)

Non-light-guiding threads: polyester multifilaments (black)

[2] Blast-grinding (1) The fabrics of [1] above were subjected to blast-grinding in accordance with all possible combinations of the following conditions, namely blasting materials 1 to 3, blasting pressures 1 to 4, and nozzle moving speeds 1 to 2.

Thereafter, a water washing and drying were performed, and light-emitting fabrics were obtained.

Blasting material 1: baking soda (sodium hydrogencarbonate with a purity of 99% or higher) having an average particle size of 0.1 mm, a hardness on the new Mohs' hardness scale of 2.5, and a polygonal particle shape Blasting material 2: baking soda (sodium hydrogencarbonate with a purity of 99% or higher) having an average particle size of 0.2 mm, a hardness on the new Mohs' hardness scale of 2.5, and a polygonal particle shape Blasting material 3: baking soda (sodium hydrogencarbonate with a purity of 99% or higher) having an average particle size of 0.3 mm, a hardness on the new Mohs' hardness scale of 2.5, and a polygonal particle shape Blasting pressure 1: 0.2 MPa, 150 mm from nozzle tip to blasting surface Blasting pressure 2: 0.3 MPa, 150 mm from nozzle tip to blasting surface Blasting pressure 3: 0.4 MPa, 150 mm from nozzle tip to blasting surface Blasting pressure 4: 0.5 MPa, 150 mm from nozzle tip to blasting surface Nozzle moving speed 1: 200 mm/min Nozzle moving speed 2: 300 mm/min

[3] Evaluation of Light-Emitting Fabric

LED light was made incident on each of the light-emitting fabrics obtained in [2] (1) above under the same conditions, and changes at the time were observed. As a result, it was confirmed that in any of the light-emitting fabrics, the light emission was enhanced in the fabric after processing as compared with the fabric before processing. In addition, in any of the light-emitting fabrics, no damage was observed in the non-light-guiding threads, and only the light-guiding threads underwent grinding. Further, no bright spot was observed, and the drop in light emission between the adjacent light-guiding threads was not conspicuous, achieving a continuous light-emitting design and resulting in a light-emitting design having a spread of light. Further, when the state of the cladding after grinding was confirmed on an image obtained by enlarging a cross-section perpendicular to a light-guiding direction by 160 times, $\theta_1 \leq \theta_0$ was confirmed.

In addition, among these examples, it was found that a larger average particle size of the blasting material or a higher blasting pressure resulted in a higher luminance on the light source side. Further, from the viewpoint of achieving a continuous light-emitting design of the light-emitting fabric and achieving a light-emitting design having a spread of light, the blasting material 2 was more preferable than the blasting material 3, and the blasting material 1 was even more preferable. In addition, the blasting pressure 3 was more preferable than the blasting pressure 4, and the blasting pressure 2 was even more preferable. Note that, any of the nozzle moving speeds could be used without any problem.

The above-mentioned examples are for illustrative purposes only and are not to be construed as limiting the invention. While the invention has been described by way of examples of typical embodiments, it is understood that the language used in the description and illustration of the invention is to be regarded as explanatory and illustrative and not restrictive. Modifications within the scope of the appended claims are possible without departing from the scope or spirit of the invention in its form as detailed herein. Although reference has been made herein to specific structures, materials and examples in the detailed description of the invention, it is not intended to limit the invention to the disclosure set forth herein, but rather, to cover all functionally equivalent structures, methods, and uses within the scope of appended claims.

What is claimed is:

1. A light-emitting fabric having light-guiding threads woven thereinto, wherein
   the light-guiding threads are side-emitting light-guiding threads each having a core surrounded by a cladding,
   at least a part of the claddings of the light-guiding threads exposed on a side of a design surface of the light-emitting fabric have areas where the cladding is removed or thinned and that facilitate a spread of light to be emitted therefrom,
   the areas of the light-guiding threads where the cladding is removed or thinned are first regions, and the first regions are defined by an angle $\theta_1$ with respect to a center of a circular cross-section of the light-guiding threads that is perpendicular to a light-guiding direction thereof,
   other areas of the light-guiding threads where the cladding is not removed or thinned are second regions, and the second regions are defined by an angle $\theta_0$ with respect to the center of the circular cross-section of the light-guiding threads that is perpendicular to the light-guiding direction thereof, and
   the angle $\theta_1$ is greater than or equal to the angle $\theta_0$.

2. The light-emitting fabric according to claim 1, wherein
   the light-guiding threads are woven together with non-light-guiding threads; and
   exposed portions of the light-guiding threads exposed between the non-light-guiding
   threads have first regions that facilitate the spread of light to be emitted therefrom.

3. The light-emitting fabric according to claim 2, wherein the non-light-guiding threads are multifilaments.

4. An interior material for vehicles, the interior material comprising the light-emitting fabric according to claim 1.

* * * * *